(12) United States Patent
Lin et al.

(10) Patent No.: US 6,409,037 B1
(45) Date of Patent: Jun. 25, 2002

(54) FREELY CONNECTABLE CHEST UNIT

(76) Inventors: Yu-Sheng Lin, 1F, No. 5, Alley 166, Chorng Yang Rd., Nan Gaang, Taipei; Kun-Huo Lin, No. 46, St. Jiunn An, Shuh Lin, Taipei Hsien, both of (TW)

( * ) Notice: Subject to any disclaimer, the term of this patent is extended or adjusted under 35 U.S.C. 154(b) by 0 days.

(21) Appl. No.: 09/984,690

(22) Filed: Oct. 31, 2001

(51) Int. Cl.[7] .............................. B65D 6/16; B65D 6/24
(52) U.S. Cl. .................... 220/4.34; 220/23.4; 220/23.8
(58) Field of Search .............................. 220/4.33, 4.34, 220/23.4, 23.8, 23.83, 23.86

(56) References Cited

U.S. PATENT DOCUMENTS

| | | | | |
|---|---|---|---|---|
| 2,501,980 A | * | 3/1950 | Wolfe | 220/4.34 |
| 3,093,259 A | * | 6/1963 | Morrison | 220/4.34 |
| 3,563,578 A | * | 2/1971 | Maller | 220/4.34 |
| 5,992,665 A | * | 11/1999 | Degter | 220/23.8 |
| 6,006,935 A | * | 12/1999 | Driver | 220/23.8 |
| 6,010,021 A | * | 1/2000 | Zuidam et al. | 220/23.4 |
| 6,250,490 B1 | * | 6/2001 | Loftlus | 220/23.8 |

* cited by examiner

Primary Examiner—Joseph M. Moy
(74) Attorney, Agent, or Firm—Dennison, Schultz & Dougherty

(57) ABSTRACT

A freely connectable chest unit assembled from two sidewall panels, a top and a bottom panel, a back panel, and a door. A first fastening mechanism firmly connects the top and the bottom panel to the sidewall and the back panels, and enables vertical connection of two or more chest units. A second fastening mechanism enables horizontal connection of two chest units at their adjacent sidewall panels. The door may be connected at one side to one of the two sidewall panels by means of a door-closing mechanism so as to be automatically or manually closed. The door is provided with a size-adjustable lock-installing opening to enable installation of differently sized locks on the door. The lock includes a projection enabling the door to be freely openably closed to the chest unit, and a locking hook enabling the door to lock and open only with a key.

13 Claims, 10 Drawing Sheets

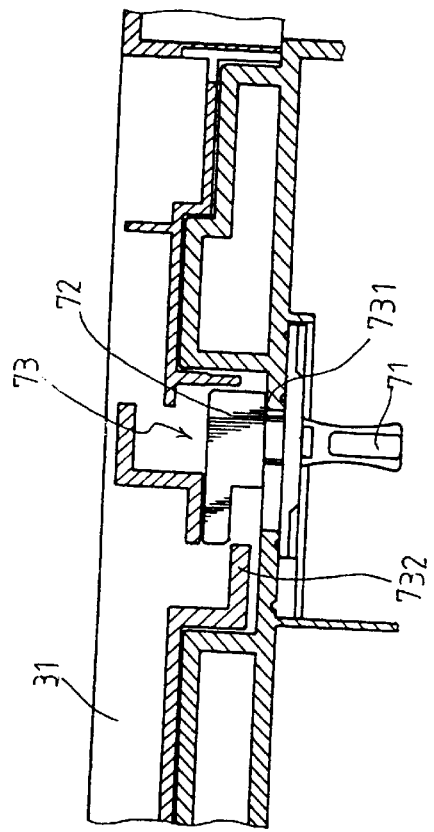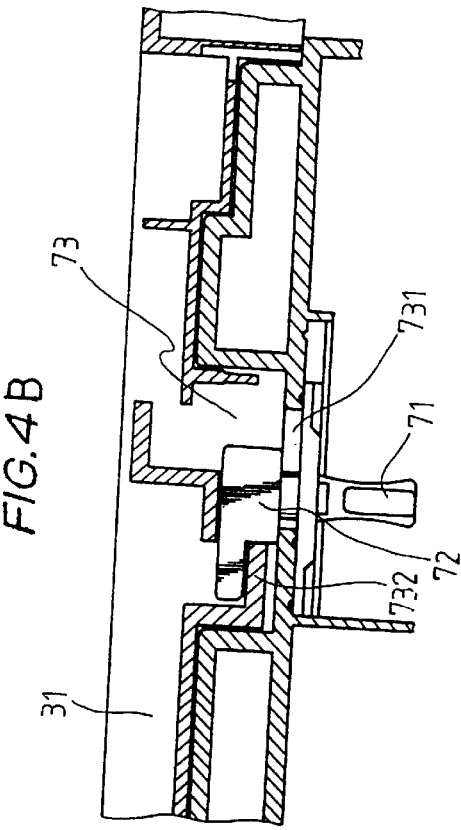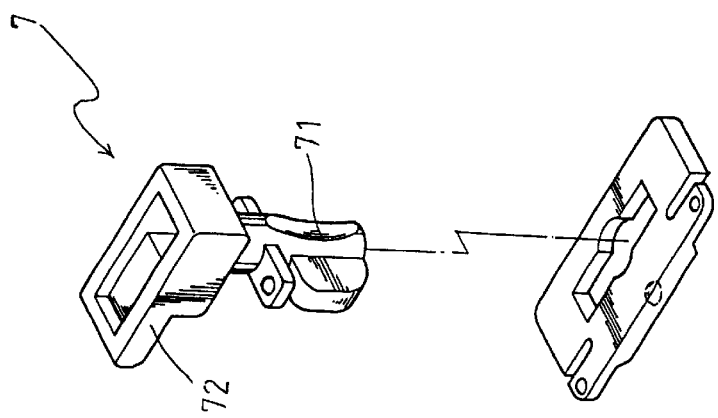
FIG. 4B
FIG. 4C
FIG. 4A

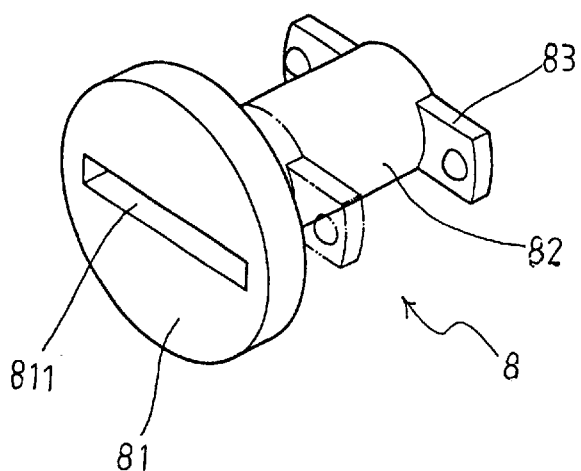
FIG.5 A
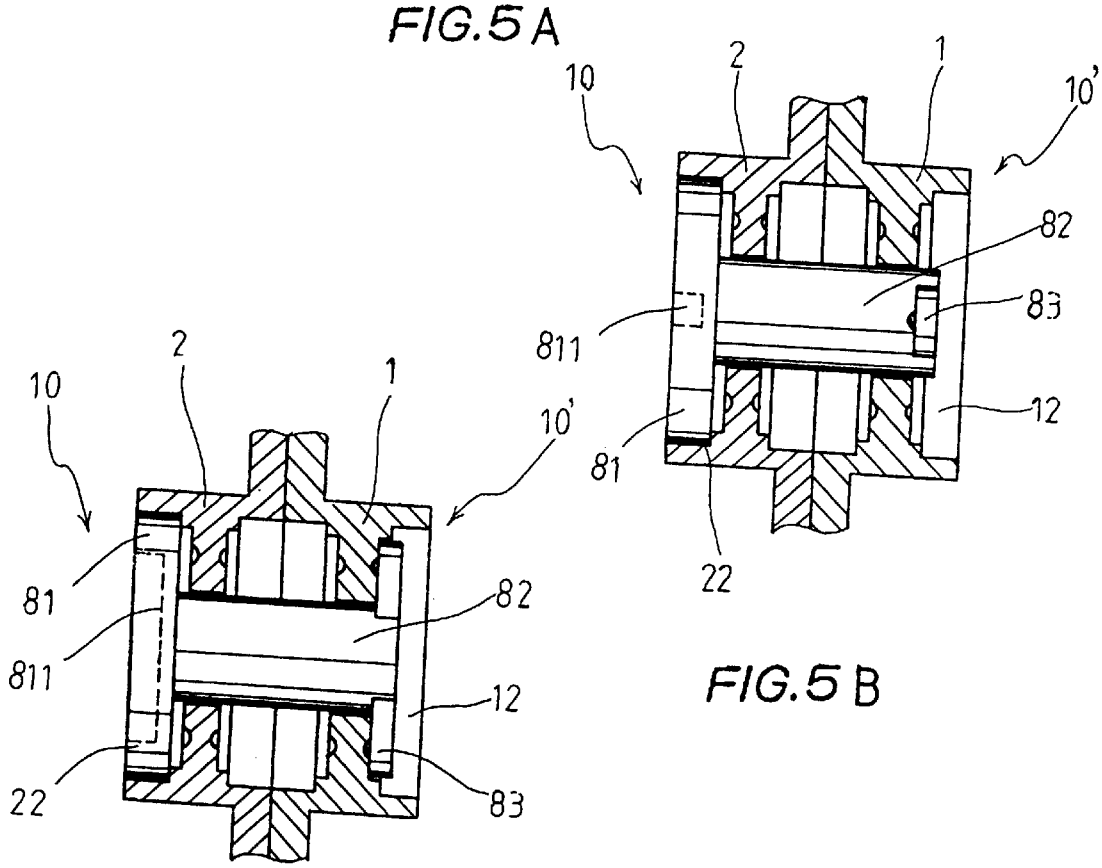
FIG.5 B
FIG.5 C

FREELY CONNECTABLE CHEST UNIT

BACKGROUND OF THE INVENTION

The present invention relates to a chest unit, and more particularly to a chest unit having novel and practical structure to enable easy assembling and disassembling of its panels to facilitate convenient transport thereof, vertical and/or horizontal connection of two and more chest units depending on actual need, and installation of differently sized locks in a size-adjustable opening on a door thereof.

A plurality of lockers arranged in multiple rows and levels are frequently provided in public places, such as railroad stations, shopping malls, playgrounds, swimming pools, etc., for users to temporarily deposit personal things therein. Each of such lockers is a sectional unit having a structure allowing horizontal or vertical connection of two or more units of such locker to one another. There are various types of lockers available in the markets. However, these conventional lockers usually have the following drawbacks:

1. The conventional lockers have sidewall panels connected to top and bottom panels only through engagement of insertion edges with corresponding grooves. The locker assembled in this manner is not structurally stable and the sidewall panels thereof tend to separate from the top and the bottom panel easily.
2. The horizontal connection of two or more conventional lockers is achieved through engagement of mating elastic fastening means. It is not convenient to mount or dismount such elastic fastening means to or from the locker, and the elastic fastening means tend to break at their fastening heads.
3. The conventional locker has a door pivotally connected to one sidewall panel of the locker via a door-closing member, which is fixedly mounted on the door and could not be separated therefrom for repair or replacement purpose. That is, a damaged door-closing member would necessitate replacement of the whole door to form a waste.
4. An additional base must be screwed to bottom panels of the conventional lockers located at the lowest level of multiple connected lockers, in order to raise all the lockers from the floor by a certain distance for easy access of the lowest lockers and isolating them from moisture. The additional base increases costs for connecting or separating it to or from the lockers.
5. A different type of lock, such as a key-operated lock, a combination lock, a coin-operated lock, etc., may be installed on the door of each locker. However, it is necessary to cut a lock opening on the door completely in accordance with the lock to be installed on the door. This causes inconvenience in manufacturing the door with lock opening.

It is therefore desirable to develop a chest unit that has novel and practical structure to eliminate drawbacks existing in the conventional lockers.

SUMMARY OF THE INVENTION

A primary object of the present invention is to provide a freely connectable chest unit that has exchangeable sidewall panels as well as exchangeable top and bottom panels and could therefore be more easily assembled and disassembled to enable convenient transport thereof.

Another object of the present invention is to provide a freely connectable chest unit that enables easy connection of it to two or more other chest units in both vertical and horizontal directions.

A further object of the present invention is to provide a freely connectable chest unit having sidewall panels, top and bottom panels, back panel and door completely made of the same recyclable material, such as a plastic material.

A still further object of the present invention is to provide a freely connectable chest unit having a detachably mounted door-closing member that could be set to two different functioning positions to allow automatic or manual closing of the door, respectively.

A still further object of the present invention is to provide a freely connectable chest unit having a size-adjustable lock-installing opening provided on the door to enable installation of differently sized locks on the door depending on actual need.

A still further object of the present invention is to provide a freely connectable chest unit having a lock that is provided with a projection detachably received in a retaining space on one sidewall panel to hold the door to a freely openable closed position, and a locking hook turnable to abut against or separate from a stopper on the same sidewall panel only when the lock is locked or opened with a key.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4A is an enlarged perspective view of a first fastening member employed in the present invention for fastening top and bottom panels to adjacent sidewall panels of the same one chest unit;

FIG. 4B shows the first fastening member of FIG. 4A in a released position;

FIG. 4C shows the first fastening member of FIG. 4A in a fastened position;

FIG. 5A is an enlarged perspective view of a second fastening member employed in the present invention for fastening two horizontally adjacent chest units together;

FIG. 5B shows the manner of installing the second fastening member;

FIG. 5C shows the installed second fastening member is turned to a fastened position;

DETAILED DESCRIPTION OF THE PREFERRED EMBODIMENTS

Figure 1:
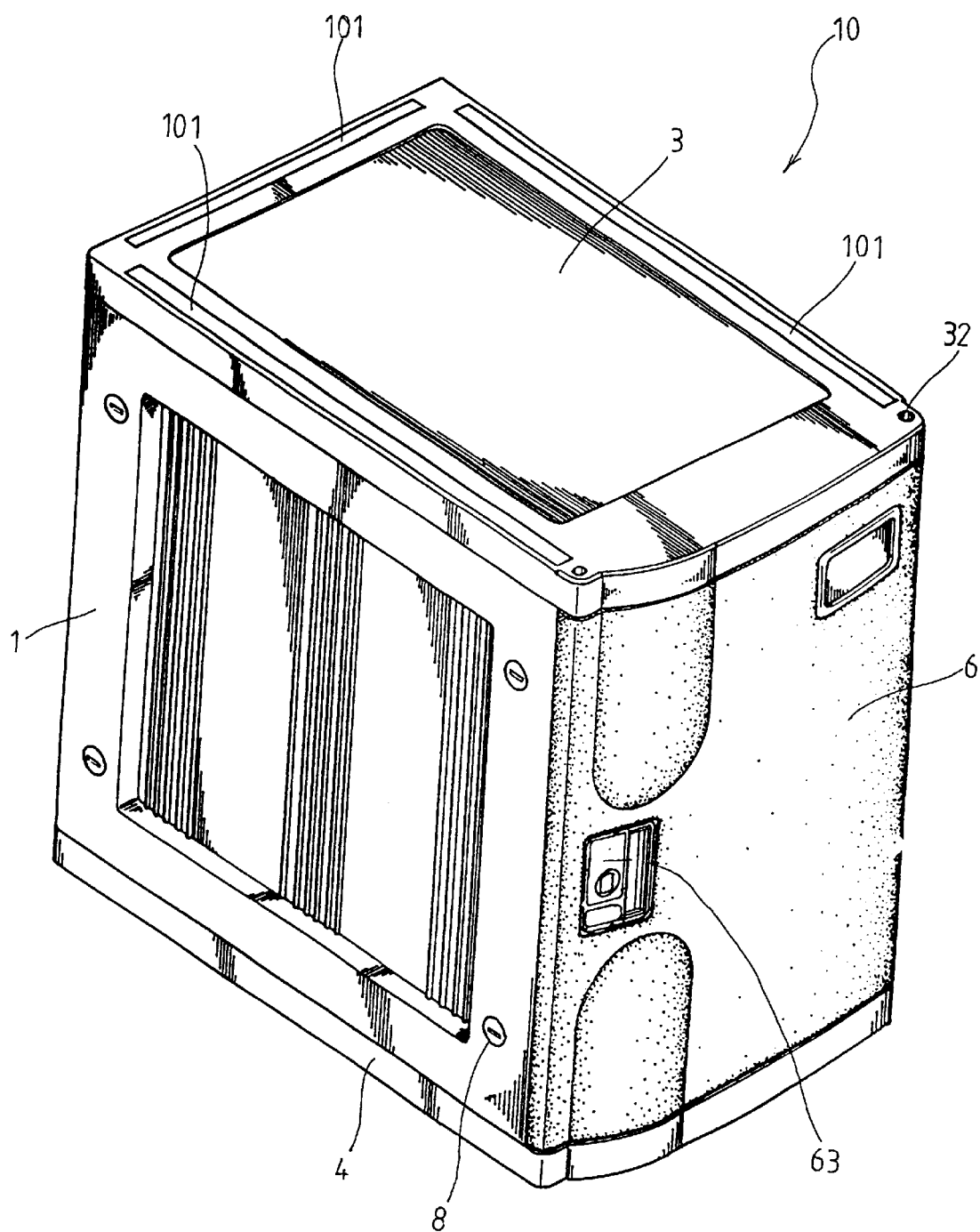
FIG. 1 is an assembled perspective view of a freely connectable chest unit of the present invention.
Figure 2:
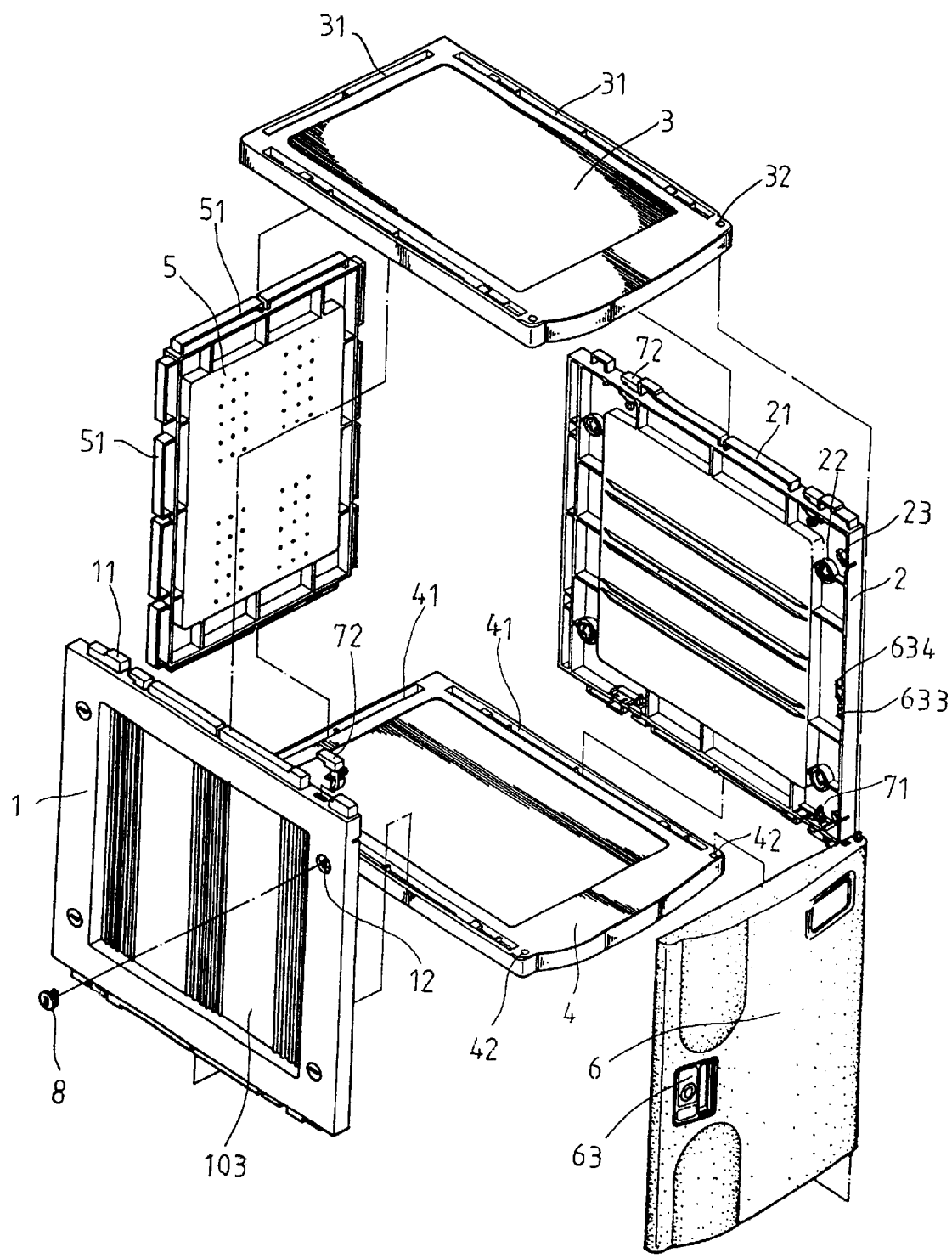
FIG. 2 is an exploded perspective view of the chest unit of FIG. 1.

Please refer to FIGS. 1 and 2 that are assembled and exploded perspective views, respectively, of a freely connectable chest unit 10 according to the present invention. A plurality of the chest units 10 may be horizontally and/or vertically connected to provide a big group of lockers.

Figure 3:
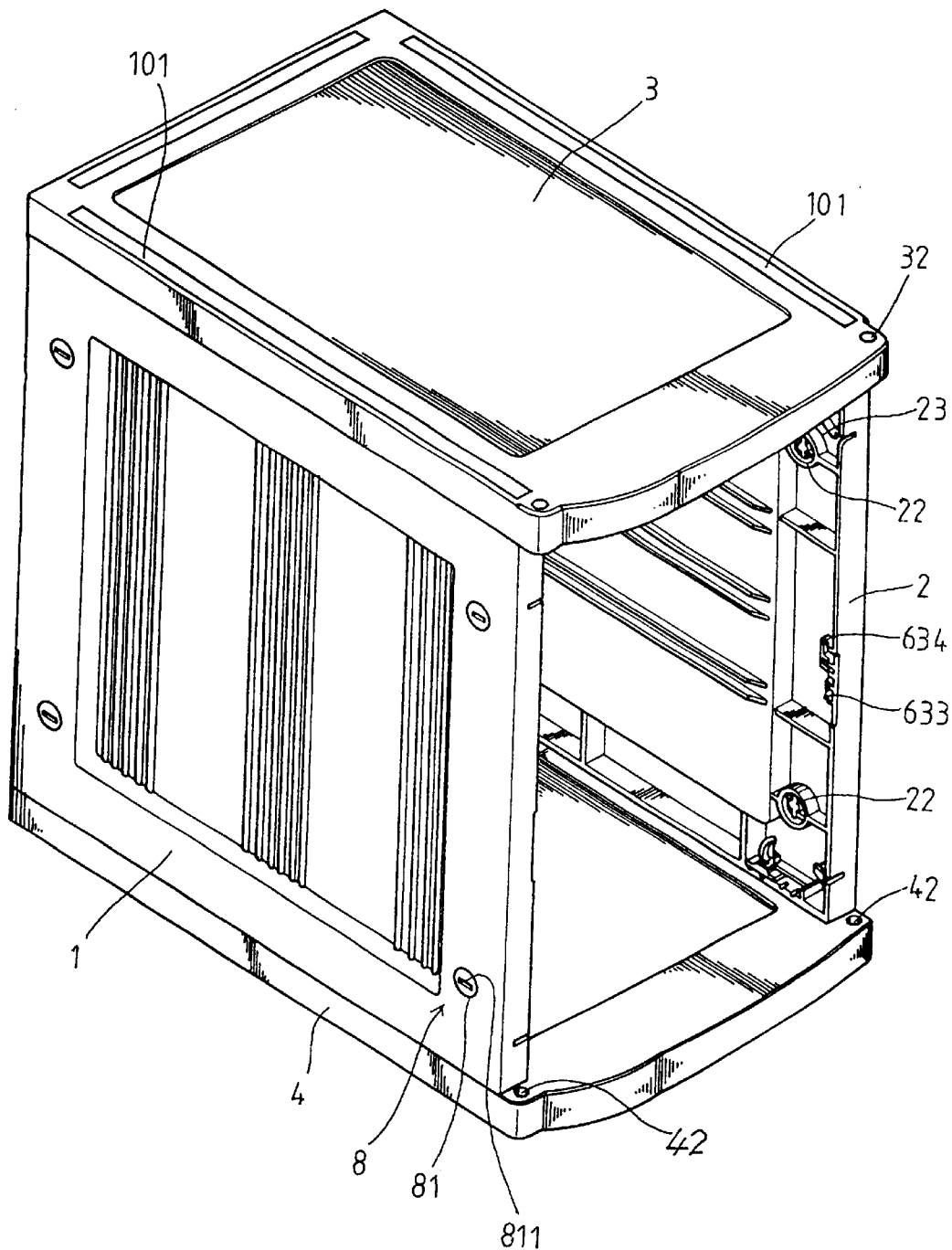
FIG. 3 shows the freely connectable chest unit of the present invention before mounting a door thereto.
Figure 6:
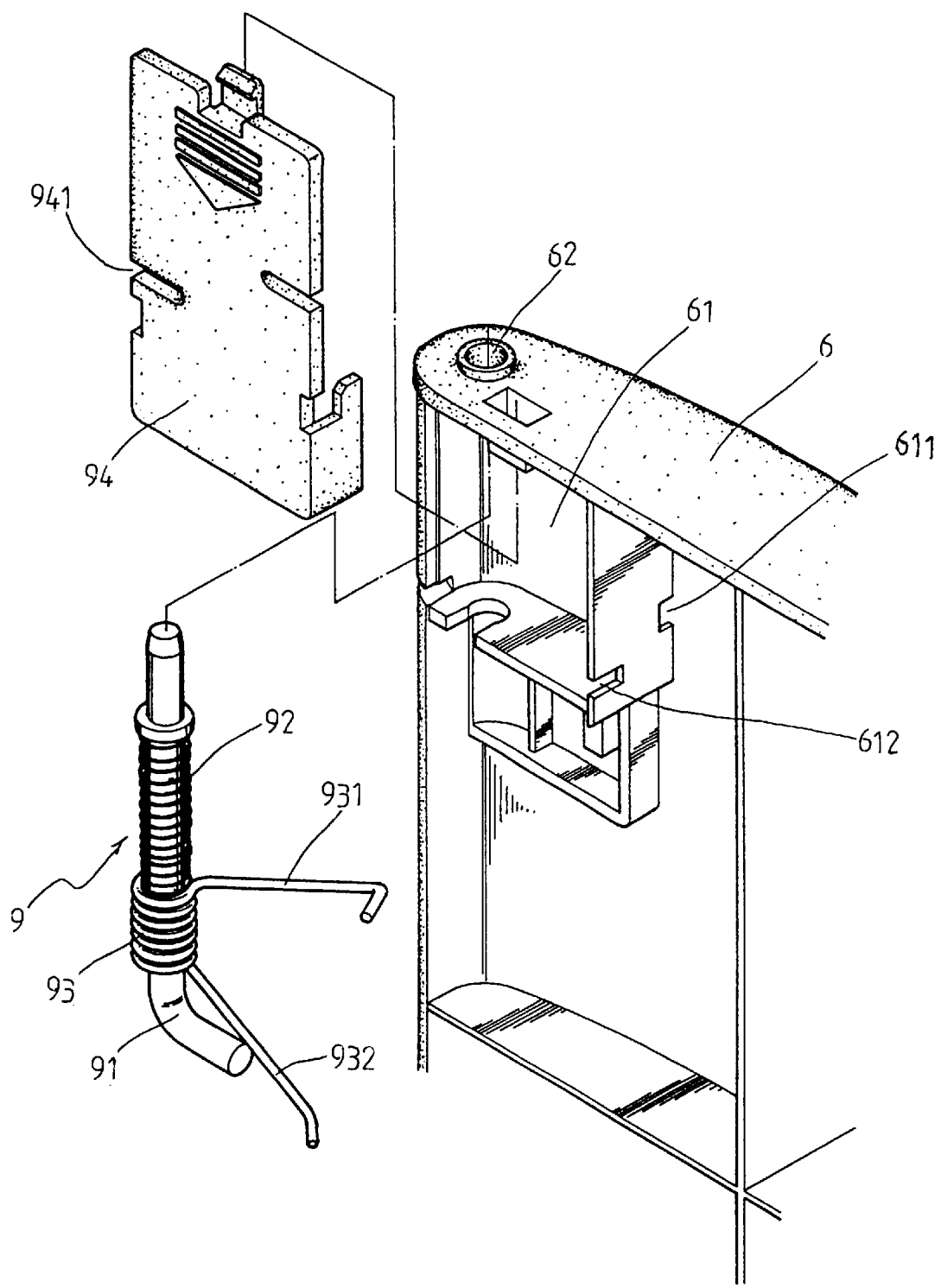
FIG. 6 is an exploded perspective view of a door-closing mechanism employed in the present invention.

As can be seen from the drawings, the chest unit 10 mainly includes a left and a right sidewall panel 1, 2, a top and a bottom panel 3, 4, a back panel 5, and a door 6. The top and the bottom panel 3 and 4 are provided along two lateral and a rear borders with a plurality of grooves 31 and 41, respectively; and the left and the right sidewall panels 1, 2 as well as the back panel 5 are provided along their respective upper and lower peripheral edges corresponding to the lateral and the rear borders, respectively, of the top and the bottom panel 3, 4 with a plurality of tongues 11, 21 and 51. By engaging the tongues 11, 21, 51 on the left and the right sidewall panels 1, 2 and the back panel 5 with corresponding grooves 31, 41 on the top and the bottom panels 3, 4, the sidewall panels 1, 2, the top and the bottom panels 3, 4, and the back panel 5 are assembled together to form a box having a front opening, at where the door 6 will be installed later. FIG. 3 shows the box assembled from the panels 1, 2, 3, 4 and 5 in the above-described manner.

Please refer to FIGS. 2 and 4A at the same time. The sidewall panels 1, 2 are further fastened to the top and the bottom panel 3, 4 by means of a first fastening mechanism. The first fastening mechanism includes more than one first fastening member 7 separately mounted to predetermined points on upper and lower peripheral edges of the two sidewall panels 1, 2, each of the first fastening members 7 having a vertical push plate 71 and a fastening plate 72 horizontally located at an inner end of the push plate 71, giving the first fastening member 7 a configuration of letter "L"; and receiving spaces 73 formed in the grooves 31, 41 of the top and the bottom panels 3, 4 corresponding to the first fastening members 7. Each of the receiving spaces 73 includes an inlet 731 via which the fastening plate 72 of the first fastening member 7 extends into the receiving space 73 to slide therein, and a blocking plate 732 that cooperates with the fastening plate 72 to set the first fastening member 7 to a fastened position that will be described in more details as below.

Please refer to FIGS. 4B and 4C. After the top and the bottom panels 3, 4 are primarily assembled to the sidewall panels 1, 2 through engagement of the grooves 31, 41 with corresponding tongues 11, 21, the fastening plate 72 of each first fastening member 7 is in a released position to locate at an inner side of the inlet 731 of the receiving space 73 with the push plate 71 projected from the inlet 731. By pushing the push plates 71 forward one by one, the fastening plates 72 are moved into a fastened position to press against outer surfaces of the blocking plates 732, and thereby firmly hold the top and the bottom panels 3, 4 to the sidewall panels 1, 2 without the risk of automatic separation of the top and the bottom panel 3, 4 from the sidewall panels 1, 2.

Please refer to FIGS. 2 and 5A at the same time. Two chest units 10 of the present invention may be horizontally connected to each other side by side by means of a second fastening mechanism. The second fastening mechanism includes more than one second fastening member 8, each of which including a turning knob 81 having a long slot 811 provided at a front surface thereof, a connecting shaft 82 extended from a rear surface of the turning knob 81 by a length decided in accordance with a total thickness of the sidewall panels 1, 2 of the two chest units 10 to be horizontally connected, and a long locking plate 83 extended across a free end of the connecting shaft 82 opposite to the turning knob 81; and mounting holes 12 and 22 provided at predetermined positions along borders of the sidewall panels 1 and 2, respectively, of the chest unit 10.

To connect two chest units 10, 10' side by side, first sequentially position the second fastening members 8 in the mounting holes 22 on the sidewall panel 2 of the first chest unit 10, so that the locking plates 83 are extended through the sidewall panel 2 of the first chest unit 10 to locate in the mounting holes 12 on the sidewall panel 1 of the second chest unit 10', as shown in FIG. 5B. Then, sequentially turn the turning knobs 81 by inserting a hard item into the long slots 811 to orient the locking plates 83 perpendicularly to the mounting holes 12 and thereby firmly hold the sidewall panel 1 of the second chest unit 10' to the sidewall panel 2 of the first chest unit 10, as shown in FIG. 5C.

For the left and the right sidewall panels 1, 2 of an independent chest unit 10 or of a leftmost and a rightmost chest unit 10, respectively, that have no other chest units 10 connected thereto, the mounting holes 12, 22 may be concealed with second fastening members 8 having connecting shafts 82 in a length equal to the thickness of one sidewall panel 1 or 2, as shown in FIG. 1, so that the chest unit or units 10 may have a beautiful appearance.

The door 6 may be connected to the left or the right sidewall panel 1 or 2 by means of an automatic door-closing mechanism. In the illustrated FIGS. 2, 6, 7A, and 7B, the door 6 is connected at a right side to the right sidewall panel 2 of the chest unit 10. The automatic door-closing mechanism includes a door-closing member 9, a mounting compartment 61 provided behind a upper right corner of the door 6 for mounting the door-closing member 9 therein, a top through hole 62 formed at a top of the door 6, and a pivot shaft (not shown) provided behind a lower right corner of the door 6 corresponding to the door-closing member 9. The door-closing member 9 mainly includes a pivot pin 91 having an end upward extended through the top through hole 62 on the door 6 to move up and down relative to the door 6, a first elastic element 92, such as a spring, being put around the pivot pin 91, and a second elastic element 93, that may also be a spring, being put around a lower part of the first elastic element 92. The second elastic element 93 has a first hooked end 931 being engaged with a slot 611 provided on the mounting compartment 61, and a second hooked end 932 being engaged with a slot 23 provided on the right sidewall panel 2 to which the door 6 is connected.

Figure 7A:
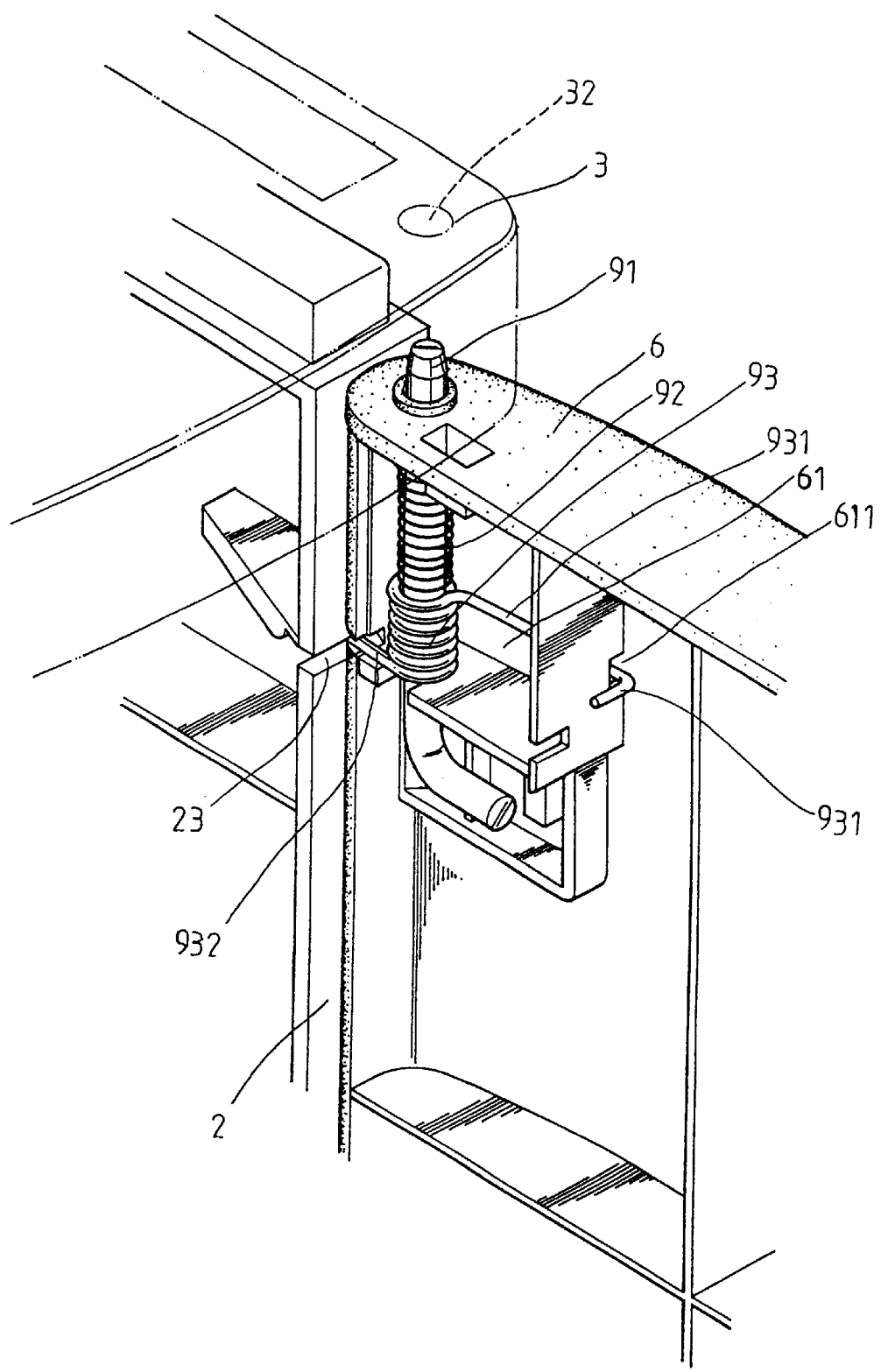
FIG. 7A is a fragmentary perspective view showing the door-closing mechanism of FIG. 6 connects the door of the chest unit to a sidewall panel and is set to a position that allows the door of the chest unit to automatically close.

Please refer to FIGS. 2 and 7A at the same time. To mount the door 6 to the freely connectable chest unit 10 of the present invention, first insert the pivot shaft behind the lower right corner of the door 6 into a corresponding pivot hole 42 provided on the bottom panel 4, and then pull the pivot pin 91 downward into the door 6 to allow mounting of the door 6 into a desired position. Thereafter, allow the first elastic element 92, that is compressed when the pivot pin 91 is pulled downward, to apply an elastic restoring force on the pivot pin 91 to move the same upward through the top through hole 62 and into a corresponding pivot hole 32 provided on the top panel 3, so as to fix the door 6 onto the chest unit 10. As having been mentioned previously, the first hooked end 931 of the second elastic element 93 is connected to the door 6 and the second hooked end 932 is connected to the right sidewall panel 2, the door 6 could therefore automatically move from an open position to a closed position due to an elastic force of the second elastic element 93. When it is desired for the door 6 to be manually closed, a user needs only to remove the second hooked end 932 of the second elastic element 93 from the slot 23 on the right sidewall panel 2.

Figure 7B:
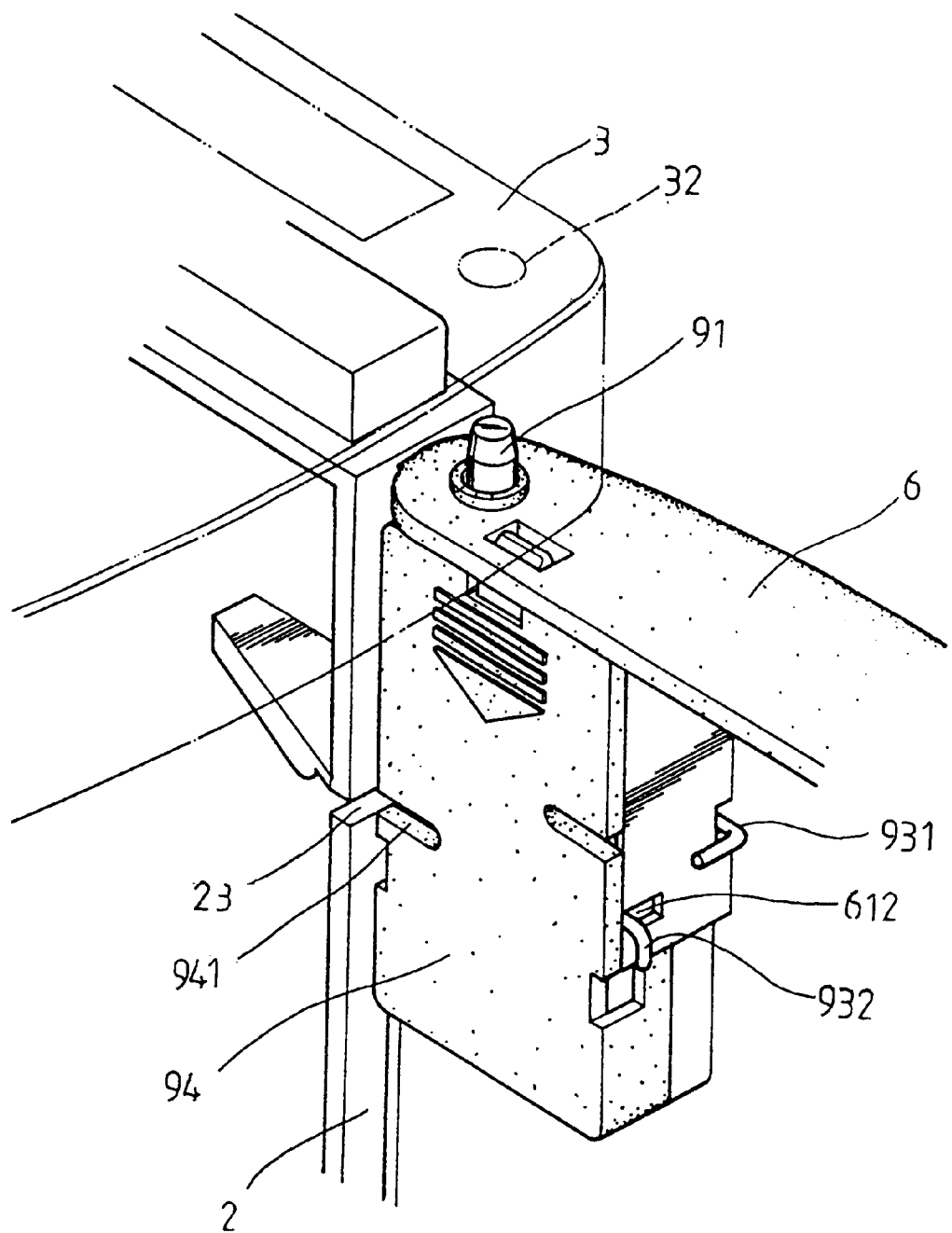
FIG. 7B shows the door-closing mechanism of FIG. 6 is set to a position that allows the door of the chest unit to manually close.

The mounting compartment 61 may be openably closed with a cover 94 to conceal the door-closing member 9 therein. The cover 94 is provided at one side adjacent to the right sidewall panel 2 with a slot 941 corresponding to the slot 23 on the right sidewall panel 2, so that the second hooked end 932 of the second elastic element 93 engaged with the slot 23 is also located in the slot 941. And, in the case the door-closing mechanism is not used to automatically close the door 6, the second hooked end 932 may be disengaged from the slots 23 and 941 to locate in another slot 612 provided on one side of the mounting compartment 61 generally opposite to the slot 941, as shown in FIG. 7B.

A lock 63 may be installed on the door 6 of the chest unit 10 for the latter to function like a locker. Please refer to FIG. 8A. An opening on the door 6 for installing the lock 63 has two fixing plates 64 separately screwed to two lateral sides of the opening. When the lock 63 is big and needs a large opening to install it, the two fixing plates 64 may be removed from the opening to provide sufficient space for the big lock 63. Or, when the lock 63 is small, the two fixing plates 64 may be screwed to the two sides of the opening to reduce the same for installing the small lock 63.

Figure 8B:
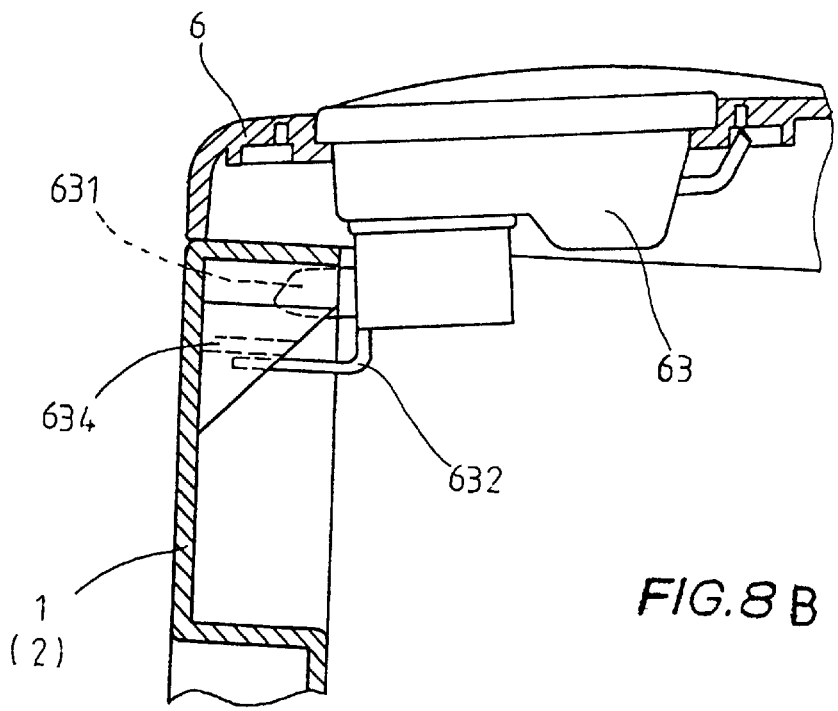
FIG. 8B shows the door lock of FIG. 8A locks the door of the chest unit to one sidewall panel thereof.
Figure 8A:
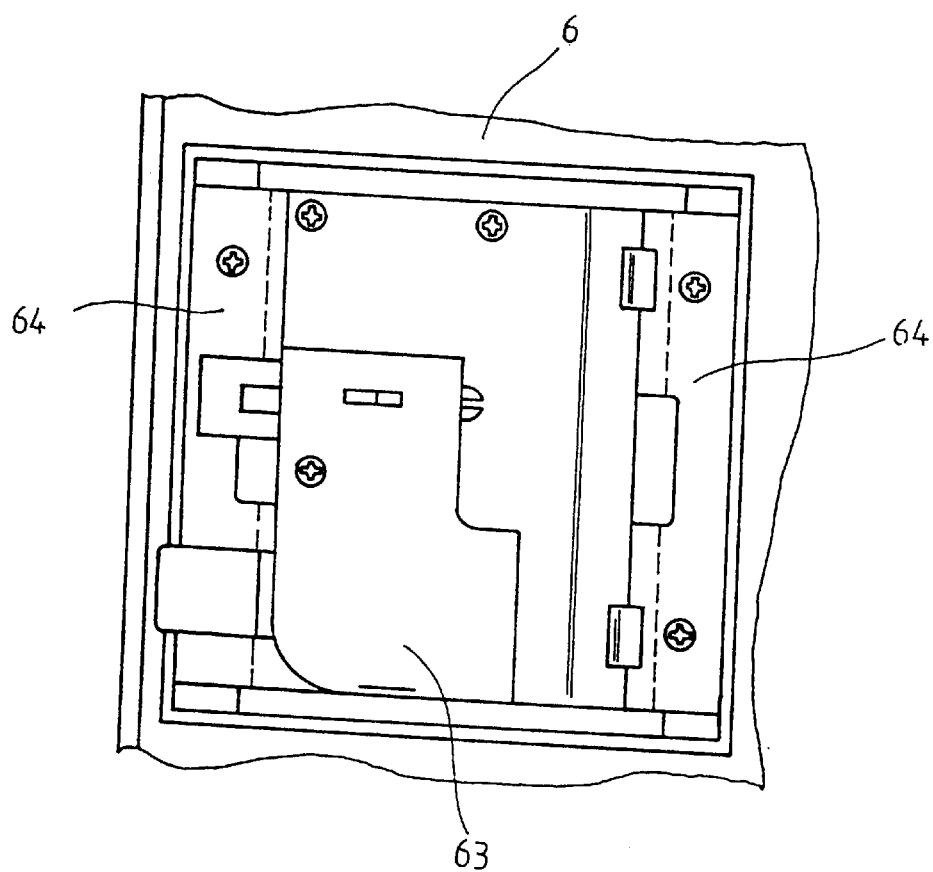
FIG. 8A shows fixing plates are installed at an opening on the door intended for a door lock.

FIG. 8B shows a locking mechanism of the lock 63. As shown, the lock 63 includes a projection 631 at a position adjacent to the left or the right sidewall panel 1 or 2, depending on an exact position at where the lock 63 is to be installed; and a locking hook 632 located behind the projection 631 and pivotally turnable only when the lock 63 is opened or locked with a key. The sidewall panel 1 or 2 is provided with a retaining space 633 (see FIG. 2) corresponding to the projection 631, so that the projection 631 of the lock 63 is received in the retaining space 633 when the door 6 is closed and holds the door 6 to the closed position. The sidewall panel 1 or 2 is also provided with a stopper 634. When the door 6 is closed and the lock 63 is locked, the locking hook 632 is turned to abut on the stopper 634 and prevents the door 6 from being opened without a key. To facilitate convenient installing of the lock 63 to any side of the door 6, the retaining space 633 and the stopper 634 may be provided at both sidewall panels 1 and 2.

Figure 9:
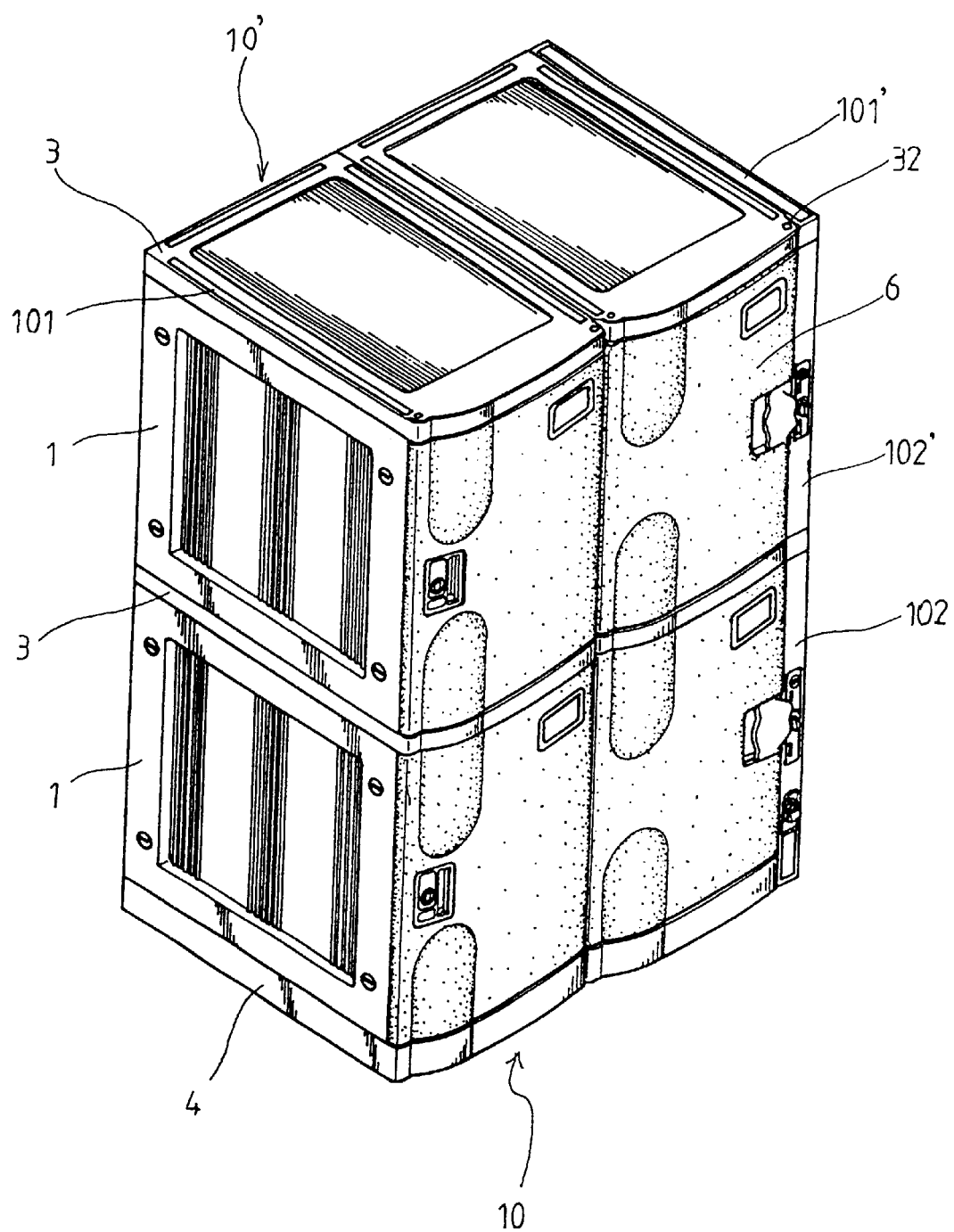
FIG. 9 shows the vertical and/or horizontal connection of a plurality of chest units of the present invention to one another and the mounting of a coin-collector to one side of the chest unit.

It is to be noted that the top and the bottom panels 3, 4 are provided at both sides, that is, upper and lower surfaces thereof, at positions corresponding to upper and lower peripheral edges of the sidewall panels 1, 2 with the grooves 31, 41. This enables exchange of the top and the bottom panels 3, 4 in assembling the chest unit 10. When a second chest unit 10' is to be stacked on a top of a first chest unit 10, as shown in FIG. 9, the top panel 3 of the first chest unit 10 at the lower position may be directly utilized as a bottom panel 4 of the second chest unit 10' at the upper position to save the bottom panel 4 that is initially provided with the second chest unit 10 or 10'. For any chest unit 10 or 10' that has not other chest unit stacked thereon, the grooves 31 on the upper surface of the top panel 3 may be covered with decorative strips 101 to maintain a beautiful appearance for the chest unit 10 or 10'.

A coin collector 102 may be installed to one side of the chest unit 10 through the above described second fastening members 8. The coin collector 102 that is located at a bottom position is provided at a lower end with a coin-collecting box (not shown). Each of the coin collectors 102 is provided at a top with a groove (not shown) for engaging with a bottom of a coin collector 102' stacked on the top of the lower coin collector 102. The groove of the topmost coin collector 102' may be covered with a decorative strip 101' to maintain a beautiful appearance for the coin collectors 102, 102'.

The bottom panel 4 of the chest unit 10 may be integrally connected to a base when the chest unit 10 is manufactured, so that the bottom panel 4 of the chest unit 10 that is located immediately above a floor need not be screwed to a separate base to simplify the assembly of the chest unit 10. Moreover, the chest unit 10 may have at least one shelf (not shown) mounted therein to provide at least two storage spaces in each chest unit 10.

The following are some advantages of the chest unit 10 of the present invention having the above-described structure:

1. The first fastening member 7 has simple structure that enables quick connection and detachment of the sidewall panels 1, 2 to and from the top and the bottom panels 3, 4 of the chest units 10 and therefore enables convenient transport of the chest unit 10 in a disassembled form. Moreover, the left and the right sidewall panels 1, 2, and the top and the bottom panels 3, 4, are exchangeable to facilitate convenient assembly of the chest unit 10.

2. The second fastening member 8 enables convenient and easy connection or detachment of two adjacent chest units 10 to or from each other without the need of using any tool.

3. All the sidewall panels 1 and 2, the top and the bottom panels 3 and 4, the back panel 5, the door 6, and the fastening members 7 and 8 may be made of the same type of material, such as plastics, ABS, etc., that is completely recyclable.

4. The door-closing member 9 may be conveniently mounted and dismounted to and from the door 6, and allows the door 6 to be automatically or manually closed, depending on a user's preference.

5. The opening on the door 6 for installing a lock has fixing plates screwed thereto to enable size adjustment of the opening, so that the opening is adapted to different types of locks.

6. The projection 631 of the lock 63 is detachably received in the retaining space 633 on the sidewall panel 1 or 2 to hold the door 6 to a freely openable closed position. And, the locking hook 632 of the lock 63 is turned to abut against or separate from the stopper 634 on the sidewall panel 1 or 2 when the lock 63 is locked or opened with a key, so that the door 6 is held to a closed or an opened position, respectively.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A freely connectable chest unit, comprising two sidewall panels, a top panel, a bottom panel, a back panel, and a door assembled into said chest unit by means of a first fastening mechanism, a second fastening mechanism, and a door-closing mechanism;

said first fastening mechanism being used to assemble said sidewall panels to said top and said bottom panel, and including more than one first fastening member separately movably mounted to predetermined points on upper and lower peripheral edges of said two sidewall panels, and receiving spaces formed on said top and said bottom panels corresponding to said first fastening members; each of said first fastening member being adapted to receive in a corresponding one of said receiving spaces at a released position when said two sidewall panels are connected to said top and said bottom panels, and said first fastening member being forward movable from said released position to a fastened position in said receiving space to firmly hold said top and said bottom panel to said sidewall panels;

said second fastening mechanism being used to horizontally connect a first and a second said chest unit to each other side by side, and including more than one second fastening member, each of which including a turning knob, a connecting shaft extended from a rear surface of said turning knob by a length decided in accordance with a total thickness of two adjacent sidewall panels of said first and said second chest unit to be horizontally connected, and a long locking plate extended across a free end of said connecting shaft opposite to said turning knob; and mounting holes provided at predetermined positions along borders of said two sidewall panels of said chest unit; each of said second fastening members being adapted to mount in one of said mounting holes on one of said two sidewall panels of said first chest unit with said turning knob located in said mounting hole and said connecting shaft extended through one of said two sidewall panels of said second chest unit adjacent to said first chest unit to locate said locking plate in a corresponding one of said mounting holes on said sidewall panel of said second chest unit, and said turning knob being turnable to orient said locking plate perpendicularly to said mounting hole on said sidewall panel of said second chest unit and thereby firmly holding said second chest unit to said first chest unit at said two adjacent sidewall panels;

said door-closing mechanism being used to connect said door to any one of said two sidewall panels of said chest unit and including a door-closing member, a mounting compartment provided behind an upper part of said door for mounting said door-closing member therein, a top through hole formed at a top of said mounting compartment, and a pivot shaft provided behind a lower part of said door corresponding to said door-closing member; said door-closing member mainly including a pivot pin having an end upward extended through said top through hole on the top of said mounting compartment, a first elastic element put around said pivot pin to allow said pivot pin to move up and down relative to said door, and a second elastic element put around a lower part of said first elastic element; and said second elastic element having a first hooked end being engaged with said door, and a second hooked end being engaged with said sidewall panel to which said door is connected;

said two sidewall panels being so structured that they are exchangeable to allow horizontal connection of two or more said chest units to one another;

said top and said bottom panel also being structured to be exchangeable in assembling said chest unit to allow vertical connection of two or more said chest units to one another; and said door-closing member automatically closing said door when said second hooked end of said second elastic element is engaged with said sidewall panel;

and said second hooked end of said second elastic element being removable from said sidewall panel to engage with said door to allow said door to be closed manually.

2. The freely connectable chest unit as claimed in claim 1, wherein said top and said bottom panel are provided at both sides along two lateral borders and a rear border with a plurality of grooves, and wherein said sidewall panels and said back panel are provided along upper and lower peripheral edges with a plurality of tongues corresponding to said plurality of grooves on said top and said bottom panel, whereby said top and said bottom panel are primarily assembled to said sidewall panels and said back panel through engagement of said grooves with said tongues.

3. The freely connectable chest unit as claimed in claim 1, wherein each of said first fastening members includes a vertical push plate and a fastening plate horizontally located at an inner end of the push plate, giving said first fastening member a configuration of a letter "L"; and wherein each of said receiving spaces includes an inlet via which said fastening plate of said first fastening member extends into said receiving space to locate at said released position, and a blocking plate that engages with said fastening plate when the latter is moved forward and thereby sets said first fastening member to said fastened position.

4. The freely connectable chest unit as claimed in claim 1, wherein said receiving spaces are formed at both sides of said top and said bottom panel corresponding to said first fastening members, enabling said top and said bottom panel to exchange with each other in assembling said chest unit.

5. The freely connectable chest unit as claimed in claim 1, wherein said bottom panel is integrally formed to include a base below said bottom panel.

6. The freely connectable chest unit as claimed in claim 1, wherein said door-closing mechanism includes a door-closing member, a mounting compartment provided behind an upper part of said door for mounting said door-closing member therein, a top through hole formed at a top of said mounting compartment, and a pivot shaft provided behind a lower part of said door corresponding to said door-closing member; said door-closing member mainly including a pivot pin having an end upward extended through said top through hole on the top of said mounting compartment, a first elastic element put around said pivot pin to allow said pivot pin to move up and down relative to said door, and a second elastic element put around a lower part of said first elastic element; and said second elastic element having a first hooked end being engaged with said door, and a second hooked end being engaged with said sidewall panel to which said door is connected.

7. The freely connectable chest unit as claimed in claim 1, wherein said first elastic element and said second elastic element are springs.

8. The freely connectable chest unit as claimed in claim 1, wherein said mounting compartment is openably closed with a cover, said cover being provided at one side adjacent to said sidewall panel to which said door is connected with a slot for said second hooked end of said second elastic element to locate therein.

9. The freely connectable chest unit as claimed in claim 1, wherein said door is provided with an opening for installing a lock thereat.

10. The freely connectable chest unit as claimed in claim 9, wherein said opening on said door has fixing plates screwed to two lateral sides of said opening; and said fixing plates being detachable from said opening to change a size of said opening to enable installation of differently sized locks thereat.

11. The freely connectable chest unit as claimed in claim 9, wherein said lock includes a projection detachably received in a retaining space formed on said sidewall panel adjacent to said lock on said door to normally hold said door to a freely openable closed position; and a locking hook being turnable to abut against or separate from a stopper provided on said sidewall panel when said lock is locked or opened with a key, and thereby holding said door to a closed or an opened position, respectively.

12. The freely connectable chest unit as claimed in claim 1, wherein each of said second fastening members includes a turning knob, a connecting shaft extended from a rear surface of said turning knob and having a length long enough for extending through two adjacent, sidewall panels of said first and said second chest unit to be horizontally connected, and a long locking plate extended across a free end of said connecting shaft opposite to said turning knob.

13. The freely connectable chest unit as claimed in claim 1, wherein said turning knob is provided at a front surface with a long slot, into which a hard item may be inserted to turn said turning knob.

* * * * *